United States Patent
De Saeger

(10) Patent No.: US 11,688,141 B2
(45) Date of Patent: *Jun. 27, 2023

(54) CONFIGURATION TOOL AND METHOD FOR A QUALITY CONTROL SYSTEM

(71) Applicant: ARKITE NV, Genk (BE)

(72) Inventor: Ives De Saeger, Hemiksem (BE)

(73) Assignee: ARKITE NV, Genk (BE)

( * ) Notice: Subject to any disclaimer, the term of this patent is extended or adjusted under 35 U.S.C. 154(b) by 0 days.

This patent is subject to a terminal disclaimer.

(21) Appl. No.: 17/564,855

(22) Filed: Dec. 29, 2021

(65) Prior Publication Data

US 2022/0122325 A1    Apr. 21, 2022

Related U.S. Application Data

(63) Continuation of application No. 16/650,536, filed as application No. PCT/EP2018/053513 on Feb. 13, 2018, now Pat. No. 11,244,507.

(30) Foreign Application Priority Data

Sep. 27, 2017 (EP) .................................... 17193384

(51) Int. Cl.
*G06T 19/00* (2011.01)
*G01F 15/075* (2006.01)
*G06F 3/01* (2006.01)
*G06T 15/08* (2011.01)

(52) U.S. Cl.
CPC ........ *G06T 19/003* (2013.01); *G01F 15/0755* (2013.01); *G06F 3/011* (2013.01);
(Continued)

(58) Field of Classification Search
None
See application file for complete search history.

(56) References Cited

U.S. PATENT DOCUMENTS

| | | | |
|---|---|---|---|
| 5,325,473 | A | 6/1994 | Monroe et al. |
| 5,646,859 | A | 7/1997 | Petta et al. |

(Continued)

FOREIGN PATENT DOCUMENTS

| | | |
|---|---|---|
| DE | 10320557 A1 | 12/2004 |
| EP | 3136314 A1 | 3/2017 |

(Continued)

OTHER PUBLICATIONS

Shaikh et al., "Chapter 2: Moving Object Detection Approaches, Challenges and Object Tracking," Moving Object Detection Using Background Subtraction, SpringerBriefs in Computer Science, Jan. 2014, 11 pages.

(Continued)

*Primary Examiner* — Frank S Chen
(74) *Attorney, Agent, or Firm* — Workman Nydegger

(57) ABSTRACT

A configuration tool adapted to configure a quality control system to monitor and/or guide an operator in a working environment through recognition of objects, events or an operational process, comprises: a volumetric sensor adapted to capture volumetric image frames of the working environment while an object, event or operational process is demonstrated; a display, coupled to the volumetric sensor and configured to live display the volumetric image frames; and a processor configured to: generate a user interface in overlay of the volumetric image frames to enable a user to define a layout zone; and automatically generate a virtual box in the layout zone when an object, event or operational process is detected during demonstration of the object, event or operational process.

15 Claims, 6 Drawing Sheets

(52) U.S. Cl.
CPC ............ *G06T 15/08* (2013.01); *G06T 19/006* (2013.01); *G06T 2207/10028* (2013.01)

(56) References Cited

U.S. PATENT DOCUMENTS

| | | |
|---|---|---|
| 6,334,684 B1 | 1/2002 | Yoshida et al. |
| 6,731,991 B1 | 5/2004 | Michalski et al. |
| 7,515,981 B2 | 4/2009 | Ryznar et al. |
| 2002/0044104 A1 | 4/2002 | Friedrich et al. |
| 2002/0105623 A1 | 8/2002 | Pinhanez |
| 2003/0002052 A1 | 1/2003 | Hoffmann |
| 2004/0051644 A1 | 3/2004 | Tamayama et al. |
| 2005/0121422 A1 | 6/2005 | Morden et al. |
| 2006/0106483 A1 | 5/2006 | Behan et al. |
| 2012/0166967 A1 | 6/2012 | Deimbacher et al. |
| 2017/0237789 A1* | 8/2017 | Harner ............... H04L 65/4015 709/205 |
| 2018/0063482 A1 | 3/2018 | Goesnar |
| 2019/0320189 A1 | 10/2019 | Cooper et al. |
| 2020/0244993 A1 | 7/2020 | Schwarz et al. |

FOREIGN PATENT DOCUMENTS

| | | |
|---|---|---|
| WO | 9849591 | 11/1998 |
| WO | 2005025199 A2 | 3/2005 |

OTHER PUBLICATIONS

Rosebrock, "Basic Motion Detection and Tracking with Python and OpenCV—PyImage Search," retrieved on Mar. 25, 2020 from https://web.archive.org/web/20150529002031/https:/www.pyimagesearch.com/2015/05/25/basic-motion-detection-and-tracking-with-python-and-opencv/, May 25, 2015, 11 pages.

Manchanda et al., "Analysis of Computer Vision Based Techniques for Motion Detection," 2016 6th International Conference—Cloud System and Big Data Engineering (Confluence), IEEE, Jan. 14, 2016, pp. 445-450, retrieved on Mar. 2, 2020 from https://ieeexplore-ieee-org.ezproxy.lib.utah.edu/document/7508161, 2016.

Extended European Search Report from EP Application No. 17193384.9, dated Nov. 24, 2017.

International Search Report and Written Opinion from PCT Application No. PCT/EP2018/053513, dated Mar. 5, 2018.

Bailey-Van Kuren, Michael, "A demanufacturing projector-vision system for combined manual and automated processing of used electronics", Computers in Industry, Dec. 2005, pp. 894-904, vol. 56, Issue 8-9.

Ledbetter, E.D., "Laser Projection links composite design to manual fabrication", Journal Computers in Industry, Dec. 2005, vol. 56, Issue 8-9, pp. 894-904.

* cited by examiner

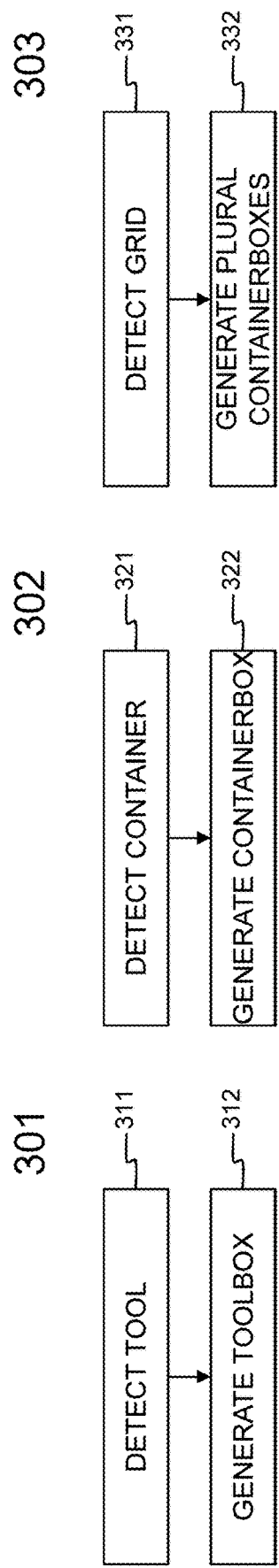
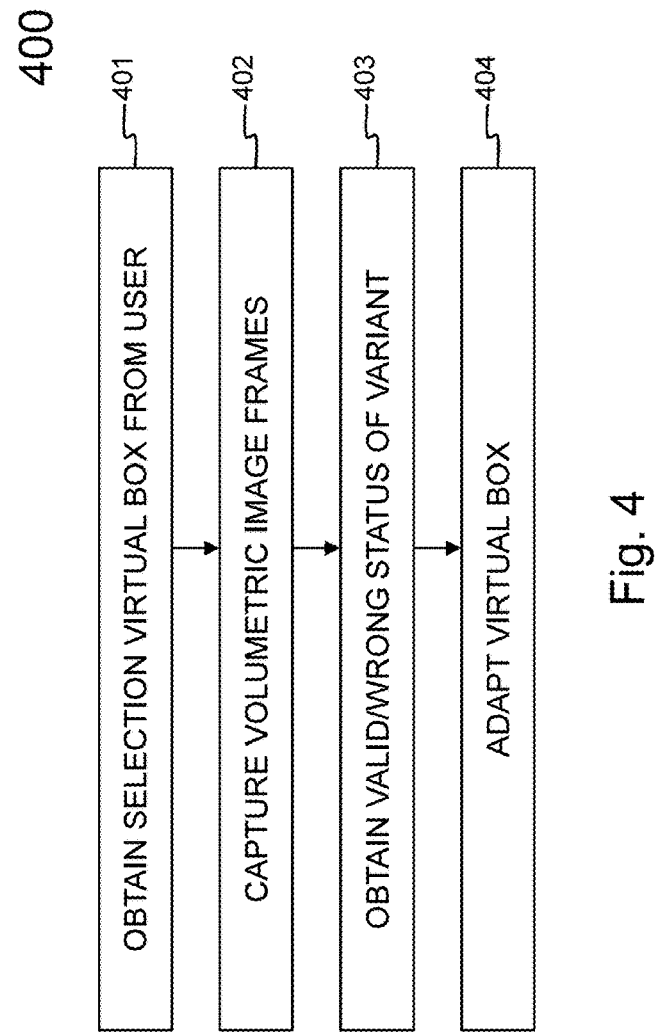

CONFIGURATION TOOL AND METHOD FOR A QUALITY CONTROL SYSTEM

FIELD OF THE INVENTION

The present invention generally relates to configuration of a quality control system that observes virtual boxes in a working environment for the presence/absence of physical objects and/or the presence of operational actions in such virtual boxes in order to be able to monitor and/or guide an operator during the execution of an operational process. Guiding the operator in the context of the present invention may include safeguarding, informing and/or teaching the operator.

BACKGROUND OF THE INVENTION

European patent application EP 3 136 314 A1, entitled "Quality Control System for a working area of an Operational Process" describes a system that relies on data received from a volumetric sensor in order to observe so called volume objects or virtual boxes for the presence and/or absence of physical objects or operational actions. The presence or absence of a physical object or an operational action in a virtual box is translated into an event by the quality control system, and the event is validated in view of a predetermined workflow sequence. The outcome of the validation process enables to monitor an operator executing an operational process in a working environment, and enables to guide the operator, for instance through projection of images approving or disapproving the operational action, warning the operator for unsafe situations, informing or teaching the operator on the executed operational action or the next operational action, etc. The quality control system described in EP 3 136 314 A1 requires that the virtual boxes are predetermined and the system is thereto equipped with a design module enabling a technician or installer of the quality control system to manually define the virtual boxes.

Predefining the virtual boxes is a time-consuming and labour-intensive activity that typically requires interrogating experienced operators that are used to execute the operational process, interpreting the information received from these experienced operators, manually defining virtual boxes from the information received, i.e. manually specifying the physical volume, required filling degree and other properties of the virtual box, and adapting the virtual boxes manually through trial and error with test operators executing the operational process.

There is thus a general desire to be able to configure a quality control system faster and more reliably, with reduced manual interventions. It is generally wished that sequences of events or processes can be defined quicker. There is also a need for customers of such quality control system to be able to implement a new process or project with minimal knowledge or no knowledge at all of vision system algorithms or events, and to be able to make changes to a defined process quickly and easily.

SUMMARY OF THE INVENTION

In accordance with the present invention, the above defined objective is achieved through a configuration tool as defined by claim 1, adapted to configure a quality control system to monitor and/or guide an operator in a working environment through recognition of objects, events or an operational process, the configuration tool comprising:

A. a volumetric sensor adapted to capture volumetric image frames of the working environment while an object, event or operational process is demonstrated;
B. a display, coupled to the volumetric sensor and configured to live display the volumetric image frames; and
C. a processor configured to:
C1. generate a user interface in overlay of the volumetric image frames to enable a user to define a layout zone; and
C2. automatically generate a virtual box in the layout zone when an object, event or operational process is detected during demonstration of the object, event or operational process.

Thus, the invention concerns a configuration tool that automatically generates one or more virtual boxes as a result of a demonstration of an object, event or operational process. This way, on-touch work instructions can be created only by showing the process once, while the person can be informed on the quality of detection during setup. The configuration tool makes use of images captured by a volumetric sensor, analyses these images to determine presence of objects or events, and selects the parameter values such as location, size, required filling level, stable threshold, projected information, type of data used to recognize objects, sequences of events or operations, logic concerning events, etc. of one or more virtual boxes that are automatically created. The configuration tool thereto comprises a volumetric sensor, e.g. an infrared camera, that captures volumetric images, e.g. infrared images of the space wherein the operational process or parts thereof like a single operational action, i.e. an event, or on object are demonstrated. It is noticed that the configuration tool may use the volumetric images as captured by a sensor, the volumetric images as captured by plural sensors, but also averaged images, background filtered images, etc. The user is only requested to identify the relevant part of the space by identifying the layout zone. This may for instance be done by drawing a rectangle in a user interface that is displayed in overlay of the captured volumetric images. If analysis of the captured images reveals the presence/absence of an object within the layout zone, the configuration tool generates a virtual box at the location of presence/absence of that object and automatically defines the virtual box, e.g. by specifying the required filling level in order to detect future appearance of that object. Similarly, if analysis of the captured images reveals the presence of an operational action, i.e. an event, or an operational process within the layout zone, the configuration tool shall also generate a virtual box at the location where the event or process took place and further define that virtual box and all logic in accordance to the detected sequence. The configuration tool reduces the involvement of a technician to predefine the virtual boxes to a minimum and increases the reliability as the parameterisation of the virtual boxes becomes more objective and less error prone compared to manual definition of all virtual boxes. It is noticed that the volumetric sensor must be able to sense presence/absence in a 3-dimensional space. Examples of such sensors are time-of-flight sensors or TOF sensors, infrared sensors or IR sensors, ultrasound sensors, Red Green Blue colour sensors or RGB sensors, multispectral or hyperspectral sensors, but the skilled person will appreciate that the present invention is not limited to any particular type of volumetric sensor. The volumetric image frames likewise represent 3-D images or in-depth images that contain information on presence/absence of objects in a 3-dimensional space, without any restriction to the particular nature of these images.

In embodiments of the configuration tool according to the present invention, as defined by claim 2, the processor is further configured to detect presence of a tool, a container or a grid through comparison of subsequent volumetric image frames during demonstration of the operational process, and to automatically generate either:

a virtual tool box at the location where the tool has been detected, for sensing presence of the tool during normal operation; or a virtual container box at the location where the container has been detected, for sensing an event in or near the container during normal operation; or a plurality of virtual container boxes at the location where objects have been detected in or near the grid, for sensing an event in or near the grid during normal operation.

Indeed, the configuration tool compares subsequent volumetric image frames generated by the volumetric sensor in order to detect presence/absence of an object or event through differences in between subsequent image frames. The term subsequent in the context of the invention must be interpreted broadly to cover images frames immediately following each other in the sequence of image frames generated by the sensor, or image frames temporarily following each other in the sequence of image frames generated by the sensor but possibly with one or more in between frames that are left unconsidered. For each object/event detected as a result of the comparison, the configuration tool defines a virtual box selected out of three different types of virtual boxes: a tool box, a container box or a grid box. A tool box shall be created when the presence/absence of a tool, e.g. a power tool, a screwdriver, a hammer, etc. has been detected. The size and fill degree of the tool box are selected to be able to distinguish a situation with presence of the tool in the physical space corresponding to the virtual box from a situation with absence of the tool in that physical space. A container box shall be created when presence of a container is detected, e.g. a plastic box, a drawer, etc., where an operator drops or picks objects like for instance screws. The container box is dimensioned to correspond with the physical space of the container when the container box is drawn in overlay of the volumetric images. A grid box at last is created when a rack or cabinet is detected, i.e. multiple associated locations where objects like tools are dropped or picked. The grid box consequently consists of multiple container boxes that are dimensioned to correspond with the entrance of the respective locations, e.g. the compartments in a rack, where objects are dropped or picked, when drawn in overlay of the captured images, such that an event near the entrance of such space can be detected. A virtual box is automatically generated and parameterised by the configuration tool, but the user is requested to confirm or select the type of virtual box.

In embodiments of the configuration tool according to the present invention, as defined by claim 3, the processor is further configured to assign a confidence level to the virtual box representative for the repetitiveness of the detection of the object during plural demonstrations of the operational process.

Indeed, to further increase the reliability, the configuration tool preferably is used to observe plural executions of the operational process or parts thereof. A virtual box that is repeatedly detected during different executions of the operational process is then assigned a higher confidence level. The repeatability or confidence may be visualized through a colour scheme when the virtual boxes are displayed in overlay of the images. A virtual tool box may for instance be coloured green when first detected and created. If the parameter values of the virtual box fluctuate too much, the virtual box is first coloured orange and at last even red. This way, the configuration tool already indicates that absence/presence of certain objects or events during execution of the operational process may be difficult, as a result of which different choices may have to be made in order to reliably monitor and/or guide an operator during the operational process. Obviously, the skilled person will appreciate that any colour scheme may be used.

In embodiments of the configuration tool according to the present invention, defined by claim 4, the processor is further configured to select a precision parameter for the virtual box, the precision parameter being one of:

a fill level;

an occlusion level;

a standard deviation; or another parameter describing the change in the virtual box, wherein the parameter with highest difference between subsequent volumetric image frames during demonstration of the operational process is selected as precision parameter.

Thus, preferred embodiments of the configuration tool according to the invention compare subsequent volumetric images on the basis of different parameters in order to establish which parameter is best used to detect presence/absence of an object or event in a virtual box. The selection of the precision parameter can be chosen differently for each sensor. The precision parameter that changes most in between subsequent images is preferably selected as this precision parameter has the highest sensitivity for distinguishing presence of an object or event from absence of an object or event in the particular virtual box under consideration. The selection of the precision parameter is done automatically by analysing the captured images during demonstration of the operational process, but may be overruled by the user. The system in general distinguishes two types of precision. The first type of precision concerns the shape of the detected object and the desire to create a virtual box that matches the shape of the object exactly. The second type of precision concerns the location of the detected object. It is possible that one type of precision, e.g. the location, may vary more than the other type of precision. If for instance a specific pen needs to be detected on a table, the setup wizard must create a virtual box whose shape and dimensions precisely match with the detected pen whereas the location of the pen on the table may vary and therefore must be less precisely specified.

In embodiments of the configuration tool according to the invention, defined by claim 5, the processor is further configured to:

detect one or more valid variants of the object, event or operational process through respective demonstrations; and automatically adapt the virtual box to include detection of the one or more valid variants during normal execution of the operational process.

Thus, the user or different users may demonstrate variants of a certain object, a certain step in the operational process, or an entire operational process and indicate that the demonstrated variants are valid variants, i.e. variants of an object, event or sequence of events that is acceptable for correct execution of the operational process. As an example, the user may demonstrate different variants of an object, e.g.

other colours, may demonstrate that more or less objects are used in product variants, may demonstrate that each detection of a fluid, a gel or viscous material will give different results, may demonstrate different valid positions or orientations of an object that is used in the process, etc. With respect to an event or operational process, operators that perform the event or process slightly differently may demonstrate variants, different operators like for instance lefthanded and righthanded operators may hold or handle a tool differently, different operators may change the sequence of process steps, e.g. first take bolt then take nut or first take nut then take bolt or first take all bolts then take all nuts, etc., a first operator may perform the steps from left to right whereas a second operator may perform the steps from right to left, a first operator may apply mounting steps in a different order, e.g. first mount all lamps in a car thereafter mount all grills versus mounting a lamp and immediately mounting the corresponding grill. If the product whereon the operational process is applied moves while process steps are executed, e.g. via a conveyor belt, the location where the steps are executed or objects are located may further vary resulting in additional valid variants. Preferred embodiments of the configuration tool shall register such valid variants and adapt the generated virtual box, for instance its location, dimensions and/or required fill level, in order to be able to detect presence/absence of the object, event or operational process in all demonstrated variants.

In embodiments of the configuration tool according to the invention, defined by claim 6, the processor is further configured to:
 detect one or more wrong variants of the object, event or operational process through respective demonstrations; and
 automatically adapt the virtual box or generate a negative virtual box to exclude detection of the one or more wrong variants during normal execution of the operational process.

Thus, the reliability of the configuration tool according to the invention may be further improved if the user is also given the option to demonstrate invalid or wrong variants of an object, a step or event in the operational process, or the operational process. As an example, the user may demonstrate positions or orientations of a tool that are not acceptable and must trigger a warning for the operator, inacceptable variants of an object, e.g. inacceptable colours, an inacceptable order or sequence of steps, etc. Preferred embodiments of the configuration tool shall register such wrong variants and adapt the generated virtual box, for instance its location, dimensions and/or required fill level, in order to exclude detection of such wrong variants as valid during normal execution of the operational process. During normal execution of the process, such wrong variants must not be detected at all or alternatively may be detected but must be distinguished from valid variants such that the operator can be guided upon execution of such wrong variant.

In embodiments of the configuration tool according to the present invention, defined by claim 7, the processor is further configured to:
 detect the object or event during normal execution of the operational process; and
 automatically adapt the virtual box in view of detection of the object or event during normal execution.

Indeed, preferred embodiments of the configuration tool according to the present invention continue to improve their reliability during normal operation. Normal execution of the operational process hence may be seen as new demonstrations by the configuration tool that enable to more precisely parameterise the generated virtual boxes.

In further embodiments of the configuration tool according to the present invention, as defined by claim 8, the processor is further configured to:
 automatically re-configure the virtual box upon detection of a position change of the volumetric sensor.

Thus, advantageous embodiments of the configuration tool automatically adapt to a position change of the volumetric sensor in between subsequent demonstrations or executions of the operational process. The volumetric images captured will differ as a result of the change in position of the volumetric sensor. To avoid having to redefine the virtual boxes each time the position of the volumetric sensor changes, the configuration tool preferably adapts the parameters of the existing virtual boxes, e.g. the dimensions, locations and/or required fill levels of these virtual boxes, in order to enable detection of the presence/absence of the corresponding object or event also based on the new position of the volumetric sensor.

In embodiments of the configuration tool according to the invention, defined by claim 9, the processor is further configured to:
 generate a user interface in overlay of the volumetric image frames to enable a user to define a work zone; and
 automatically generate a process box in the work zone when a sequence of events is detected during demonstration of the operational process.

Thus, in addition to the layout environment wherein the configuration tool detects the presence/absence of an object, event or process in order to create a tool box, a container box or a grid box, the user is enabled to specify a working environment wherein the configuration tool detects a sequence of events in order to create a process box.

In embodiments of the configuration tool according to the present invention, defined by claim 10, the processor is further configured to:
 automatically generate a process by sequencing multiple virtual boxes similar to the virtual box and/or process boxes similar to said process box, in correspondence with the order wherein events associated with said multiple virtual boxes and/or process boxes have been detected during the demonstration.

Thus, advantageous embodiments of the invention are able to automatically establish a process by sequencing plural virtual boxes and/or process boxes. This way, an entire process can be monitored, including the order of execution of different steps in the process.

In embodiments of the configuration tool according to the invention, defined by claim 11, the processor is further configured to detect an event during the demonstration by:
 C2a. capturing volumetric image frames during the demonstration;
 C2b. background filtering the volumetric image frames;
 C2c. comparing pixels of a volumetric image frame during the demonstration with corresponding pixels in a preceding volumetric image frame during the demonstration to determine a difference level for each pixel;
 C2d. counting the amount of pixels that differs between the volumetric image frame and the preceding volumetric image frame to obtain a frame difference value; and
 C2e. detecting an event when the frame difference value for each one of a first minimum amount of subsequent frames exceeds a first threshold, and the aggregate frame difference value across the first minimum amount of subsequent frames exceeds a second threshold.

This way, a demonstrated operational process is subdivided in steps or positions in space where specific steps happen. The volumetric image frames are recorded for the entire demonstration of the operational process or the entire demonstration of a part of the operational process. For each one of the volumetric image frames, each pixel is compared with the corresponding pixel in the previous volumetric image frame, for instance through use of a double background filter, and a difference value or difference level is determined for each pixel. This results in a list of difference values wherein a value of zero represents a standstill whereas high values represent movement. For each volumetric image frame, a frame difference value is then determined by summing the pixel difference values for all pixels in that frame. In case the average frame difference value exceeds a certain frame difference threshold, i.e. the above mentioned second threshold, and this for an amount of subsequent frames that exceeds a frame amount threshold, i.e. the above mentioned first threshold, the set of subsequent frames is considered to represent a step or event in the demonstrated process.

In order to determine the position and size of the process box corresponding to the detected step or event, the difference between a volumetric image frame and the previous frame is quantified by dividing their respective frame difference values. The frame with the highest value is considered to represent the absity frame. Within the absity frame, a rectangular box comprising all differing pixels, i.e. pixels that differ from the corresponding pixel in the previous frame by an amount exceeding a predetermined pixel difference threshold. The so construed rectangular box is considered to be the process box. The distance of the box may be set equal to the minimum distance of the pixels in the absity frame that are also included in the process box minus 100. The depth of the process box may for instance be set equal to the minimum distance of the pixels in the first frame and last frame of the demonstrated process minus the distance of the box minus 10. The filling degree may be set equal to 10-100.

The skilled person will appreciate that variant embodiments of the configuration tool according to the present invention may implement different algorithms to detect the presence or absence of objects or events by analysing volumetric image frames recorded during demonstration of an operational process. The background filtering must not necessarily be applied to subsequent frames but may span plural frames, the thresholds set to subdivide the demonstrated process in steps or events, and the criterion used to determine within a single step the absity frame that will be used to locate, dimension and parameterise the virtual box that is automatically generated may be chosen differently in alternative embodiments of the configuration tool.

In embodiments of the configuration tool according the present invention, defined by claim 12, the user interface is adapted to enable a user to specify feedback for an operator during normal execution of the operational process.

Thus, in addition to automatically generating and parameterising the virtual boxes that will be used to monitor and guide an operator during execution of an operational process, the configuration tool also may request the user to specify the feedback to be given to an operator. The feedback may for instance be an image, sign or colour encouraging the operator in case of correct execution of the operational process or a step therein, and a different image, sign or colour warning or guiding the operator in case of incorrect execution of the operational process or a step therein.

In embodiments of the configuration tool according to the present invention, defined by claim 13, the user interface is adapted to bring a 3D (CAD) model of the object into the volumetric image frames.

Indeed, user experience of the configuration tool according to the invention may be further enhanced by displaying a 3D CAD drawing of the sensed object in overlay onto the volumetric images.

In addition to a configuration tool as defined by claim 1, the present invention also concerns a corresponding configuration method for configuring a quality control system to monitor and/or guide an operator in a working environment through recognition of objects, events or an operational process, as defined by claim 14, the configuration method comprising:
  A. capturing volumetric image frames of the working environment while an object, event or operational process is demonstrated through a volumetric sensor;
  B. live displaying the volumetric image frames;
  C1. generating a user interface in overlay of the volumetric image frames to enable a user to define a layout zone; and
  C2. automatically generating a virtual box when an object, event or operational process is detected during demonstration of the object, event or operational process.

The present invention further also concerns a quality control system for monitoring and/or guiding an operator in a working environment, as defined by claim 15, the quality control system being coupled to a volumetric sensor for observing predetermined virtual boxes for presence or absence of a physical object or an operational action, the quality control system comprising:
  a configuration tool adapted to configure the quality control system, the configuration tool comprising:
  A. the volumetric sensor adapted to capture volumetric image frames of the working environment while an object, event or operational process is demonstrated;
  B. a display, coupled to the volumetric sensor and configured to live display the volumetric image frames;
  C. a processor configured to:
  C1. generate a user interface in overlay of the volumetric image frames to enable a user to define a layout zone; and
  C2. automatically generate a virtual box in the layout zone when an object, event or operational process is detected during demonstration of the object, event or operational process.

Hence, the configuration tool according to the invention may be integrated in a quality control system and make use of the volumetric sensor that is used by the quality control system to capture volumetric images during normal execution of the operational process.

Embodiments of the quality control system according to the present invention, defined by claim 15, further comprise:
  a workflow module adapted to retrieve volumetric observational data from the working environment and configured to:
  D1. observe one or more virtual box generated by the configuration tool based on said volumetric observational data;
  D2. detect presence or absence of a physical object or an operational action within the one or more virtual box;

D3. create an event if presence or absence of a physical object or an operational action is detected in the one or more virtual box; and D4. validate said event.

Thus, the quality control system in addition to the configuration tool also comprises a workflow module that observes the virtual boxes generated by the configuration tool, detects presence or absence of an object or action in a virtual box created by the configuration tool, translates the detection into an event and validates the event in order to be able to guide the operator.

BRIEF DESCRIPTION OF THE DRAWINGS

FIG. 3A-3C illustrate variant implementations of the automatic generation of a virtual box in the method illustrated by FIG. 2, i.e. step 204 in the method of FIG. 2;

FIG. 4 shows the additional steps executed in an embodiment of the method for configuring a quality control system according to the present invention that allows to demonstrate valid variants and/or wrong variants of an operational process;

DETAILED DESCRIPTION OF EMBODIMENT(S)

Figure 1:
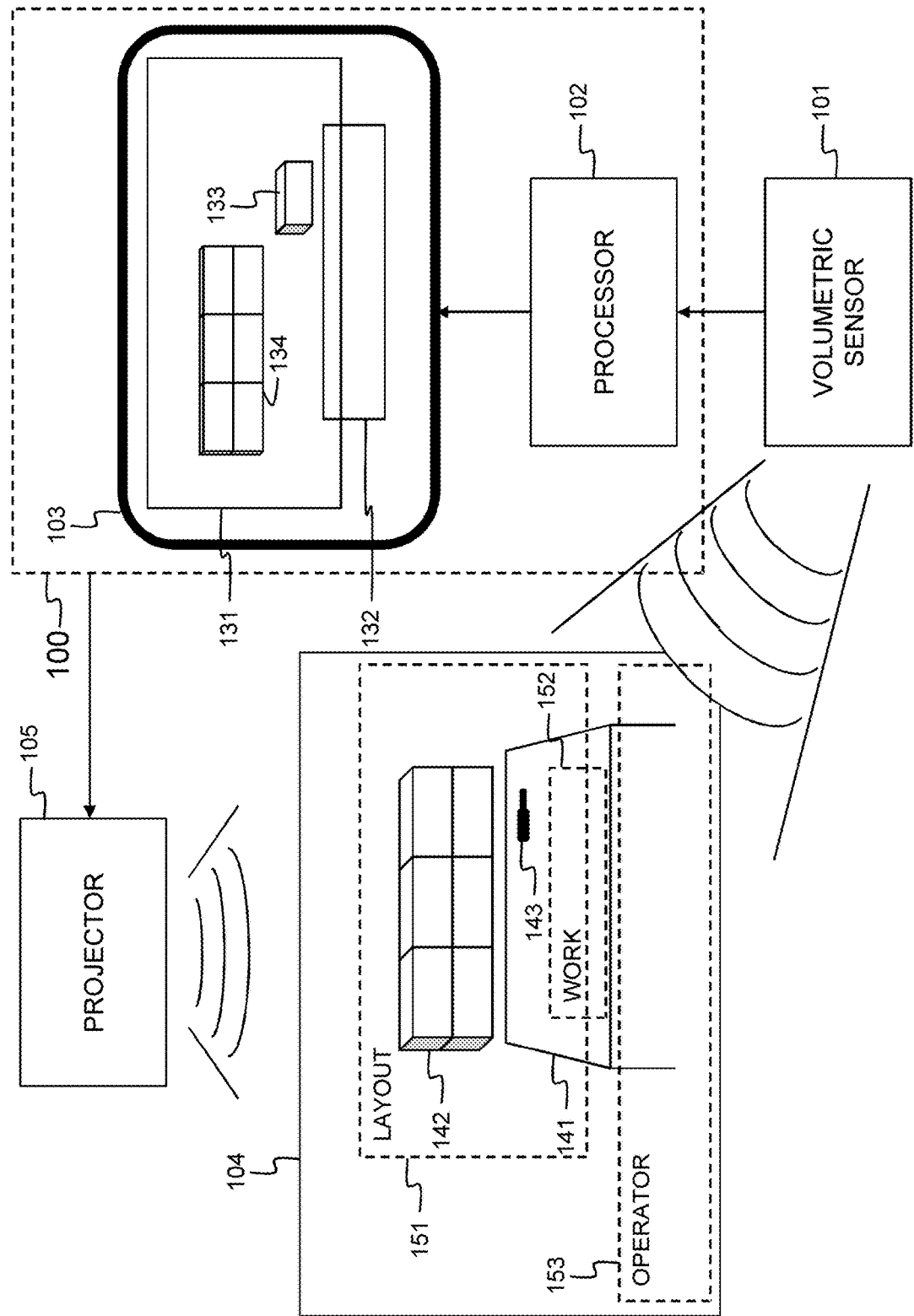
FIG. 1 illustrates an embodiment of the quality control system according to the present invention, comprising a configuration tool 100 according to the present invention.

FIG. 1 shows a quality control system comprising a processor 102 and a display 103. The quality control system is coupled to a volumetric sensor 101, e.g. an RGB camera, a TOF camera, an infrared sensor, etc., and to a projector 105. The volumetric sensor 101 captures volumetric images of a working environment 104 wherein an operator is supposed to execute an operational process. The term "volumetric sensor" in the context of the present invention should be interpreted to cover any system of one or more sensors suitable to observe the three-dimensional working environment 104, and suitable to provide three-dimensional observation data to the quality control system. The observation data, e.g. pixels of the captured images, thus contain in-depth information indicative for the distance between points in the working environment 104 and a specific reference point, e.g. the location of a sensor. In the working environment 104, the operator has to execute an operational process. On desk 141, the operator for instance has to insert a screw in an object. The screw must be taken from one of the six drawers in rack 142 and must be inserted in the object using screwdriver 143. The object must first be taken from a container and must be placed on the desk 141. In order to monitor the operational process executed by the operator and to guide the operator during execution of the operational process, the quality control system analyses the volumetric images received from sensor system 101. More particularly, the quality control system observes predetermined virtual boxes 133 and 134 in order to assist the operator and verify if the operator is executing the proper steps in the proper order. The quality control system of FIG. 1 comprises a configuration tool 100 that automatically or semi-automatically generates the virtual boxes 133 and 134, as will be explained with reference to FIG. 2 below. This configuration tool 100 enables the user to specify in overlay of the images captured by volumetric sensor 101 a layout zone 131 and a work zone 132. The layout zone 131 corresponds to a layout area 151 in the working environment 104, i.e. an area wherein the objects are located that will be used during the operational process. The work zone 132 corresponds to a work area 152 in the working environment 104, i.e. an area wherein the operational process must be executed. Optionally, and not drawn in FIG. 1, the configuration tool 100 may further enable the user to specify an operator zone, i.e. a zone in the captured images corresponding to an operator area 153 in the working environment 104, i.e. an area where the operator is supposed to be during execution of the operational process. Such operator zone may for instance be used to verify presence of the operator during the operational process. The quality control system further provides guidance to the operator executing the operational process through a projector 105 projecting images in the working environment 104 to provide feedback to the operator.

In order to automatically or semi-automatically generate the virtual boxes 133 and 134, the processor 102 controls volumetric sensor 101 in step 201 to capture volumetric image frames. The volumetric image frames captured in step 201 are real-time displayed in display 103 in step 202 and the user is requested to indicate the layout zone 131 in a graphical user interface that is displayed in overlay of the volumetric image frames. The layout zone 131 is the area in the volumetric image frames the the processor 102 shall analyse in step 204 for the presence/absence of objects, e.g. tools or containers, or events during demonstration of the operational process or portions of the operational process. Detection of the presence/absence of objects or events shall enable the processor 102 to automatically generate one or more virtual boxes. In step 205, the processor 102 selects for each of the generated virtual boxes the precision parameter, i.e. the parameter with greatest variation between presence and absence of an object or the parameter with greatest variation during an event. The precision parameter is selected such that absence/presence of the object during execution of the operational process or absence/presence of an event during execution of the operational process becomes detectable with highest precision, i.e. with minimal false positive detections and minimal detection misses. In step 206 the user is requested to identify the work zone 132 in the graphical user interface that is displayed in overlay of the real time displayed volumetric image frames. The work zone 132 corresponds to the area in the working environment 104 wherein the process steps of the operational process are executed. In the example of FIG. 1, the work zone 133 would for instance correspond to an area above desk 141 where the operator is supposed to insert the screw in the object. Once the work zone 132 has been defined by the user, the processor 102 automatically generates process boxes in step 207, i.e. virtual boxes that correspond to process steps in the operational process, and/or automatically specifies a process by defining the order between virtual boxes.

Figure 2:
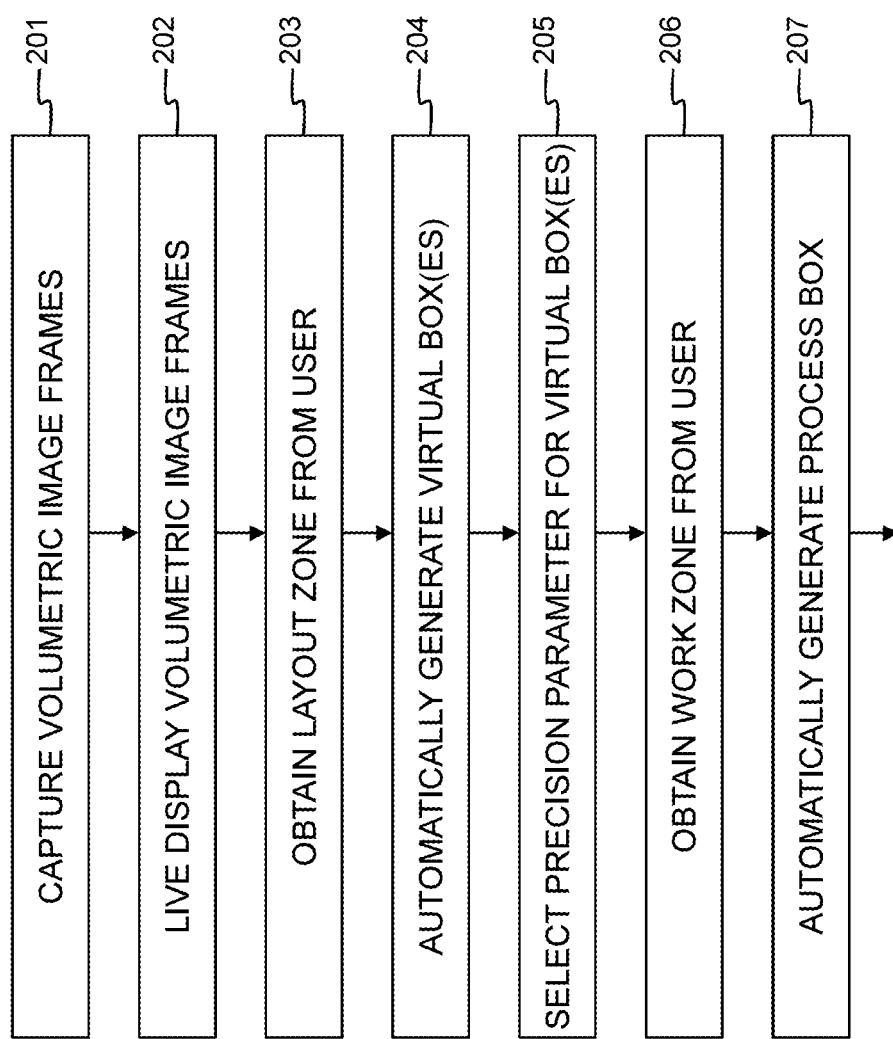
FIG. 2 shows the steps executed in an embodiment of the method 200 for configuring the quality control system of FIG. 1 according to the present invention.

The detection of an object and generation of a corresponding virtual box in step 204 of FIG. 2 may have different variants, three of which, 301, 302 and 303, are illustrated respectively in FIG. 3A, FIG. 3B and FIG. 3C.

In FIG. 3A, the processor 102 analysing the layout zone 131 in the volumetric image frames detects in step 311 the presence of a tool, e.g. the presence of screwdriver 143. Consequently, the processor 102 shall automatically generate and parameterise a virtual toolbox 133 in step 312. This virtual toolbox 133 may have a cube or beam shape as depicted in FIG. 1. Alternatively, the virtual toolbox may have a shape that fits the shape of the detected tool, e.g. the shape of the detected screwdriver in the above given example. In parameterising the toolbox, the processor 102 shall automatically specify the location and size of the toolbox, as well as the required filling degree. In later executions of an operational process, the toolbox shall represent the area wherein the screwdriver must be detected in order for instance to provide positive feedback to the operator. Since the exact location and orientation of tools is often of minor importance for perfect execution of an operational process or step, the toolbox may be dimensioned with margins thus giving the operator flexibility with respect to the position of the tool. These margins are set automatically by the processor 102 upon creation of the toolbox, but may be overruled by the user in case greater or smaller flexibility with respect to the tool's position is desired.

In FIG. 3B, the processor 102 analysing the layout zone 131 in the volumetric image frames detects in step 321 the presence of a container, e.g. a plastic container holding screws or bolts. Consequently, the processor 102 shall automatically generate and parameterise a virtual container box in step 322. This virtual container box is a rather thin box covering the entrance or opening of the physical container where it corresponds to. The virtual container box may have a cube or beam shape but alternatively may have a shape that fits the shape of the detected container or the container opening, e.g. the shape of a cylinder. In parameterising the container box, the processor 102 shall automatically specify the location and size of the container box, as well as the required filling degree. In later executions of an operational process, the container box shall represent the area wherein an event or handling by the operator must be detected, e.g. the picking or dropping of a screw, in order for instance to provide positive feedback to the operator. Since the exact location and orientation of containers might be of minor importance for perfect execution of an operational process or step, the container box may be dimensioned with margins thus giving the operator some flexibility with respect to the position of the container and the location where a handling involving the container is executed. These margins are set automatically by the processor 102 upon creation of the container box, but may be overruled by the user in case greater or smaller flexibility with respect to the container's position is desired.

In FIG. 3C, the processor 102 analysing the layout zone 131 in the volumetric image frames detects in step 331 the presence of a grid, e.g. a rack 142 with six drawers. Consequently, the processor 102 shall automatically generate and parameterise a virtual grid box 134 in step 332. This virtual grid box 134 consists of a plurality of container boxes respectively covering the entrance or opening of the different drawers or sub-segments of the grid. The container boxes that jointly form virtual grid box 134 may have a cube or beam shape but alternatively may have a shape that fits the shape of the detected drawer or sub-segment openings, e.g. the shape of a cylinder. In parameterising the grid box 134, the processor 102 shall automatically specify the location and size of the container boxes, as well as the required filling degree. In later executions of an operational process, the container boxes that jointly form the grid box 134 shall represent the different areas wherein an event or handling by the operator must be detected, e.g. the picking or dropping of a screw and bolt of the proper size, in order for instance to provide positive feedback to the operator or to provide corrective feedback to the operator. Since the exact location and orientation of a grid may differ for perfect execution of an operational process or step, e.g. in case the grid corresponds to a rack on wheels that is rolled into the working environment 104 prior to execution of the operational process, the container boxes may be dimensioned with some margins. These margins are set automatically by the processor 102 upon creation of the grid box 134, but may be overruled by the user in case greater or smaller flexibility with respect to the rack's position is desired.

FIG. 4 illustrates the process 400 that is executed by embodiments of the configuration tool that enable to demonstrate valid variants of an operational process or step, wrong variants of an operational process or step, valid positions/orientations or wrong positions/orientations of a tool or object. In step 401, the user is requested to select the already existing virtual box that will be adapted in view of a valid or wrong variant that will be demonstrated. Thereafter, in step 402, the valid or wrong variant is demonstrated while the volumetric sensor is capturing volumetric image frames and the configuration tool is real-time displaying these volumetric images. The user is then requested by the configuration tool in step 403 to specify if the demonstrated variant is a valid variant or a wrong variant. In step 404, the configuration tool at last adapts the in step 401 selected virtual box to include the demonstrated variant in case of a valid variant or to exclude the variant in case of a wrong variant. Adapting the selected virtual box shall typically involve adjusting the parameters of the virtual box, e.g. adjusting its location, shape, size, margins, required filling degree, etc., in order to include or exclude the demonstrated variant. Step 404 however also may involve creating additional virtual boxes or negative virtual boxes to enable inclusion of certain valid variants or to enable exclusion of certain wrong variants of position and/or orientation of objects or of operational steps in an operational process.

Figure 5:
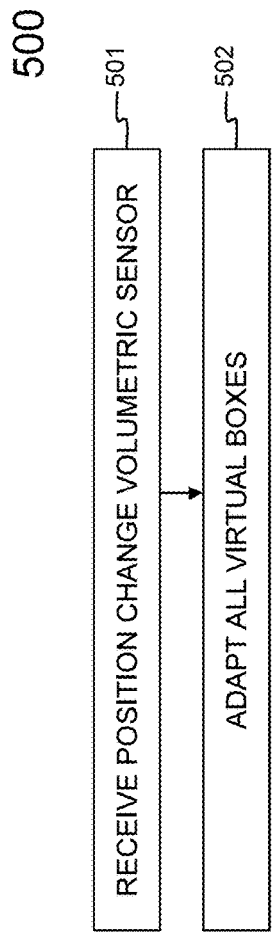
FIG. 5 shows the additional steps executed in an embodiment of the method for configuring a quality control system according to the present invention that automatically adapts to position changes of the volumetric sensor.

FIG. 5 illustrates the process 500 executed by embodiments of the configuration tool 100 that support automatic adaptation to position and/or orientation changes of the volumetric sensor 101. In step 102 the processor receives information indicative for the position and/or orientation change of volumetric sensor 101. This information may be in the form of relative or absolute positioning coordinates of the volumetric sensor 101, for instance in case the volumetric sensor 101 is equipped with positioning technology. The information alternatively may be obtained through analysis of the volumetric image frames obtained by the volumetric sensor in its new position, like for instance the detection of one or more reference point or object in these image frames, compared to the position of such reference point(s) or object(s) in historic image frames, captured by the volumetric sensor in its previous location. In step 502, the parameters of all virtual boxes are automatically adjusted to the new position and/or orientation of the volumetric sensor 101. The location and size, but also for instance the shape and required filling degree of the virtual boxes hence are adjusted to account for the new position and/or orientation and consequently for the new viewpoint of the volumetric sensor 101. This way, time consuming, manual and error prone reconfiguration of the auto-configured quality control system is avoided each time the location or orientation of the volumetric sensor 101 is adapted intentionally or accidentally.

Figure 6:
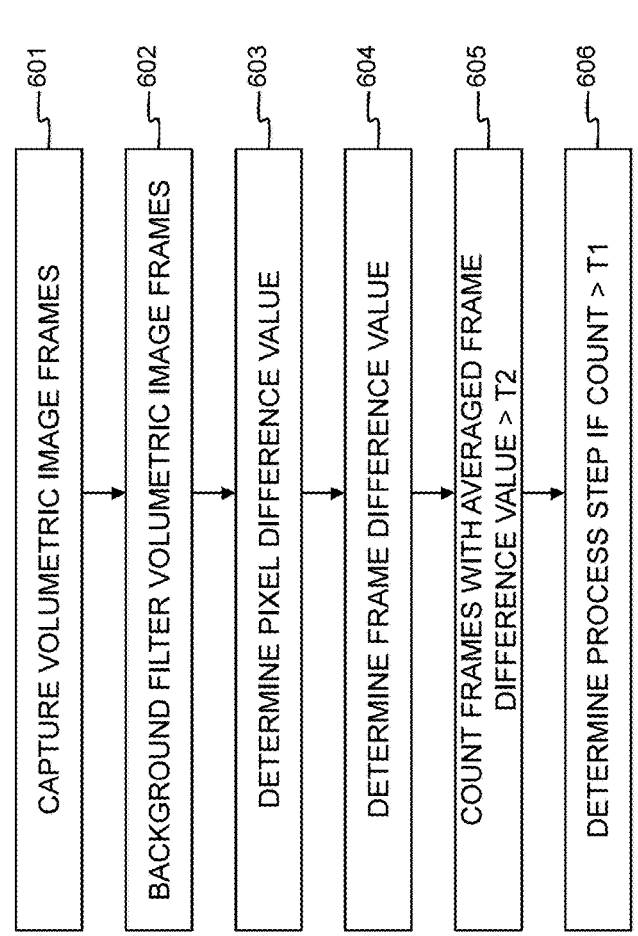
FIG. 6 shows the steps executed in an embodiment of the method for configuring a quality control system according to the present invention in order to divide an operational process in process steps.

FIG. 6 illustrates in more detail the process 600 that is executed by embodiments of the configuration tool to distinguish different process steps in an operational process that is demonstrated. In step 601, the processor 102 captures the volumetric image frames from the volumetric sensor 101 while the operational process is demonstrated. The volumetric image frames are real-time displayed in display 103. In step 602, the processor 102 background filters the volumetric images. Background filtering of image frames is well-known in the art and the present invention is not restricted to any particular type of background filtering. For each background filtered image frame, pixels are compared with corresponding pixels in the previous image frame and the difference in pixel value is determined for each pixel in step 603. If the pixel difference value exceeds a certain threshold, the pixel is considered to have differed between the previous image frame and the current image frame. For the entire image frame, the amount of pixels that has differed is counted. This results in a frame difference value for each image frame in step 604, where a value of zero represents a standstill whereas a high value represents substantial movement. In step 605 the amount of subsequent frames with average frame difference value above a certain threshold T2, with for instance T2=500, is determined. If this amount of frames exceeds another threshold T1, with for instance T1=20, then in step 606 this set of subsequent frames is considered to represent a process step in the demonstrated operational process. Through the algorithm illustrated by FIG. 6, an entire operational process that is demonstrated can be subdivided in process steps. For each of the process steps, a virtual process box can be generated as will be explained below with reference to FIG. 7.

Figure 7:
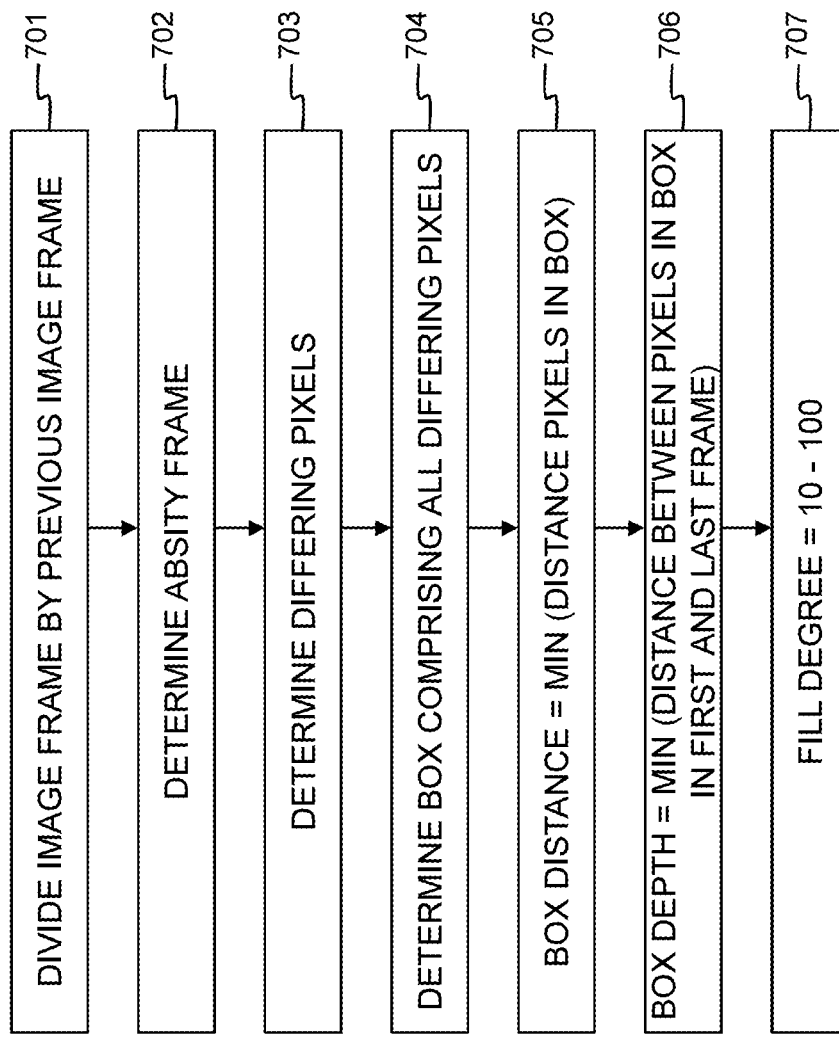
FIG. 7 shows the steps executed in an embodiment of the method for configuring a quality control system according to the present invention in order to automatically generate and parameterise a virtual box.

FIG. 7 illustrates the process 700 executed by embodiments of the configuration tool to automatically generate a virtual process box. In the subset of image frames that jointly represent a process step, the difference between an image frame and the previous image frame is determined in step 701 by dividing the image frame by the previous image frame (or alternatively for instance by the second previous, the third previous or any other predefined previous image frame). The frame with the highest difference value is elected to constitute the absity frame in step 702. Within the absity frame, differing pixels are determined in step 703, i.e. pixels whose pixel value differs from the pixel value of the corresponding pixel in the previous frame by more than a given threshold value. The smallest rectangular box that contains all differing pixels in the absity frame is thereafter determined in step 704. This rectangular box determines the height and width of the virtual process box. The box distance, i.e. the distance from the volumetric sensor 101 to nearest edge of the virtual process box if this box would be placed in the work environment 104, is determined in step 705. This box distance in the embodiment illustrated by FIG. 7 is set equal to the minimal distance of all pixels in the absity frame that also form part of the rectangular box generated in step 704. Alternatively, this minimal distance value of pixels in the rectangular box could for instance be further reduced by a predefined tolerance value, e.g. 100, to set the virtual process box distance. The depth of the virtual process box is determined in step 706 and is for instance set equal to the minimum distance of pixels in the first and last volumetric image frame of the process step that are laying in the rectangular box generated in step 704 minus the box distance value as determined in step 705. Alternatively, the so calculated virtual process box depth may be further reduced by a predefined value, e.g. 10. The fill degree level of the virtual process box is set between 10 and 100 in step 707. This way, position, size and required fill degree are configured automatically to thereby parameterise a virtual process box that will be used during normal execution of an operational process to verify if the corresponding process step is executed properly by the operator.

Figure 8:
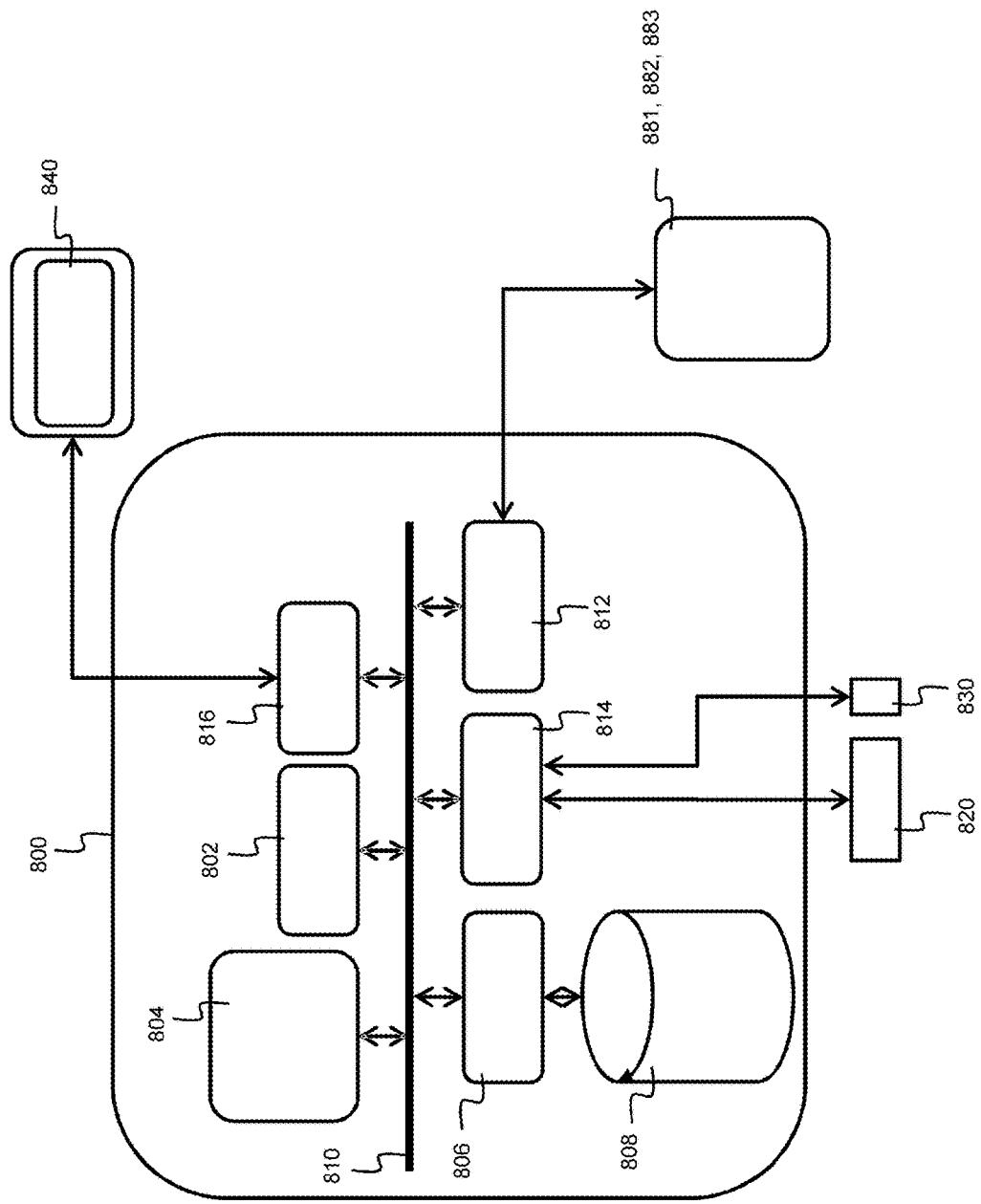
FIG. 8 illustrates a suitable computing system 800 for realizing embodiments of the method and tool for configuring a quality control system in accordance with the present invention.

FIG. 8 shows a suitable computing system 800 according to an embodiment of the invention. Computing system 800 is suitable for implementing embodiments of the method for configuring a quality control system in line with the present invention. Computing system 800 may in general be formed as a suitable general-purpose computer and comprise a bus 810, a processor 802, a local memory 804, one or more optional input interfaces 814, one or more optional output interfaces 816, a communication interface 812, a storage element interface 806 and one or more storage element 808. Bus 810 may comprise one or more conductors that permit communication among the components of the computing system 800. Processor 802 may include any type of conventional processor or microprocessor that interprets and executes programming instructions. Local memory 804 may include a random access memory (RAM) or another type of dynamic storage device that stores information and instructions for execution by processor 802 and/or a read only memory (ROM) or another type of static storage device that stores static information and instructions for use by processor 802. Input interface 814 may comprise one or more conventional mechanism that permit an operator or user to input information to the computing device 800, such as a keyboard 820, a mouse 830, a pen, voice recognition and/or biometric mechanisms, a camera, etc. Output interface 816 may comprise one or more conventional mechanisms that output information to the operator or user, such as a display 840, etc. Communication interface 812 may comprise any transceiver-like mechanism such as for example one or more Ethernet interfaces that enables computing system 800 to communicate with other devices and/or systems, for example with other computing devices 881, 882, 883. The communication interface 812 of computing system 800 may be connected to such another computing system by means of a local area network (LAN) or a wide area network (WAN) such as for example the internet. Storage element interface 806 may comprise a storage interface such as for example a Serial Advanced Technology Attachment (SATA) interface or a Small Computer System Interface (SCSI) for connecting bus 810 to one or more storage elements 808, such as one or more local disks, for example SATA disk drives, and control the reading and writing of data to and/or from these storage elements 808. Although the storage elements 808 above is described as a local disk, in general any other suitable computer-readable media such as a removable magnetic disk, optical storage media such as a CD or DVD, -ROM disk, solid state drives, flash memory cards, . . . could be used. It is noticed that the entire method according to the present invention can be executed centralized, e.g. on a server in a management centre or in a cloud system, or it can be partially executed on a remote electronic device, e.g. worn by the user, and partially on a central server. Computing system 800 could thus correspond to the processing system available centrally or the processing system available in the electronic device.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A configuration tool adapted to configure a quality control system to monitor and/or guide an operator in a working environment through recognition of objects, events or an operational process, said configuration tool comprising:
   (A) a volumetric sensor adapted to capture volumetric image frames of said working environment while an object, event or operational process is demonstrated;
   (B) a display, coupled to said volumetric sensor and configured to live display said volumetric image frames; and
   (C) a processor configured to:
   (C1) generate a user interface in overlay of said volumetric image frames to enable a user to define a layout zone;
   (C2) automatically generate a virtual box in said layout zone when an object, event or operational process is detected during demonstration of said object, event or operational process; and
   (C3) select a precision parameter for said virtual box, said precision parameter being one of:
      a fill level;
      an occlusion level;
      a standard deviation; or
      another parameter describing a change in a virtual box, wherein the parameter with highest difference between subsequent volumetric image frames during demonstration of said operational process is selected as precision parameter.

2. The configuration tool according to claim 1, wherein said processor is further configured to detect presence of a tool, a container or a grid through comparison of subsequent volumetric image frames during demonstration of said operational process, and to automatically generate either:
   a virtual tool box at the location where said tool has been detected, for sensing presence of said tool during normal operation; or
   a virtual container box at the location where said container has been detected, for sensing an event in or near said container during normal operation; or
   a plurality of virtual container boxes at the location where objects have been detected in or near said grid, for sensing an event in or near said grid during normal operation.

3. The configuration tool according to claim 1, wherein said processor is further configured to assign a confidence level to said virtual box representative for the repetitiveness of the detection of said object during plural demonstrations of said operational process.

4. The configuration tool according to claim 1, wherein said processor is further configured to:
   detect one or more valid variants of said object, event or operational process through respective demonstrations; and
   automatically adapt said virtual box to include detection of said one or more valid variants during normal execution of said operational process.

5. The configuration tool according to claim 1, wherein said processor is further configured to:
   detect one or more wrong variants of said object, event or operational process through respective demonstrations; and
   automatically adapt said virtual box or generate a negative virtual box to exclude detection of said one or more wrong variants during normal execution of said operational process.

6. The configuration tool according to claim 1, wherein said processor is further configured to:
   detect said object or event during normal execution of said operational process; and
   automatically adapt said virtual box in view of detection of said object or event during normal execution.

7. The configuration tool according to claim 1, wherein said processor is further configured to:
   automatically re-configure said virtual box upon detection of a position change of said volumetric sensor.

8. The configuration tool according to claim 1, wherein said processor is further configured to:
   generate a user interface in overlay of said volumetric image frames to enable a user to define a work zone; and
   automatically generate a process box in said work zone when a sequence of events is detected during demonstration of said operational process.

9. The configuration tool according to claim 1, wherein said processor is further configured to:
   automatically generate a process by sequencing multiple virtual boxes similar to said virtual box and/or process boxes similar to said process box, in correspondence with the order wherein events associated with said multiple virtual boxes and/or process boxes have been detected during said demonstration.

10. The configuration tool according to claim 9, wherein said processor is further configured to detect an event during said demonstration by:
- (C2a) capturing volumetric image frames during said demonstration;
- (C2b) background filtering said volumetric image frames;
- (C2c) comparing pixels of a volumetric image frame during said demonstration with corresponding pixels in a preceding volumetric image frame during said demonstration to determine a difference level for each pixel;
- (C2d) counting the amount of pixels that differs between said volumetric image frame and said preceding volumetric image frame to obtain a frame difference value; and
- (C2e) detecting a process step when said frame difference value for each one of a first minimum amount of subsequent frames exceeds a first threshold, and the aggregate frame difference value across said first minimum amount of subsequent frames exceeds a second threshold.

11. The configuration tool according to claim 1, wherein said user interface is adapted to enable a user to specify feedback for an operator during normal execution of said operational process.

12. The configuration tool according to claim 1, wherein said user interface is adapted to bring a 3D CAD model of said object into said volumetric image frames.

13. A configuration method for configuring a quality control system to monitor and/or guide an operator in a working environment through recognition of events, said configuration method comprising:
- (A) capturing volumetric image frames of said working environment while an object, event or operational process is demonstrated through a volumetric sensor;
- (B) live displaying said volumetric image frames;
- (C1) generating a user interface in overlay of said volumetric image frames to enable a user to define a layout zone;
- (C2) automatically generating a virtual box when an object, event or operational process is detected during demonstration of said object, event or operational process; and
- (C3) selecting a precision parameter for said virtual box, said precision parameter being one of:
    - a fill level;
    - an occlusion level;
    - a standard deviation; or
    - another parameter describing a change in a virtual box,
  wherein the parameter with highest difference between subsequent volumetric image frames during demonstration of said operational process is selected as precision parameter.

14. A quality control system for monitoring and/or guiding an operator in a working environment, said quality control system being coupled to a volumetric sensor for observing predetermined virtual boxes for presence or absence of a physical object or an operational action, said quality control system comprising:
- a configuration tool adapted to configure said quality control system, said configuration tool comprising:
- (A) said volumetric sensor adapted to capture volumetric image frames of said working environment while an object, event or operational process is demonstrated;
- (B) a display, coupled to said volumetric sensor and configured to live display said volumetric image frames;
- (C) a processor configured to:
- (C1) generate a user interface in overlay of said volumetric image frames to enable a user to define a layout zone; and
- (C2) automatically generate a virtual box in said layout zone when an object, event or operational process is detected during demonstration of said object, event or operational process;
- (C3) select a precision parameter for said virtual box, said precision parameter being one of:
    - a fill level;
    - an occlusion level;
    - a standard deviation; or
    - another parameter describing a change in a virtual box,
  wherein the parameter with highest difference between subsequent volumetric image frames during demonstration of said operational process is selected as precision parameter.

15. The quality control system according to claim 14, further comprising:
- a workflow module adapted to retrieve volumetric observational data from said working environment and configured to:
- (D1) observe one or more virtual box generated by said configuration tool based on said volumetric observational data;
- (D2) detect presence or absence of a physical object or an operational action within said one or more virtual box;
- (D3) create an event if presence or absence of a physical object or an operational action is detected in said one or more virtual box; and
- (D4) validate said event.

* * * * *